Figure 1:
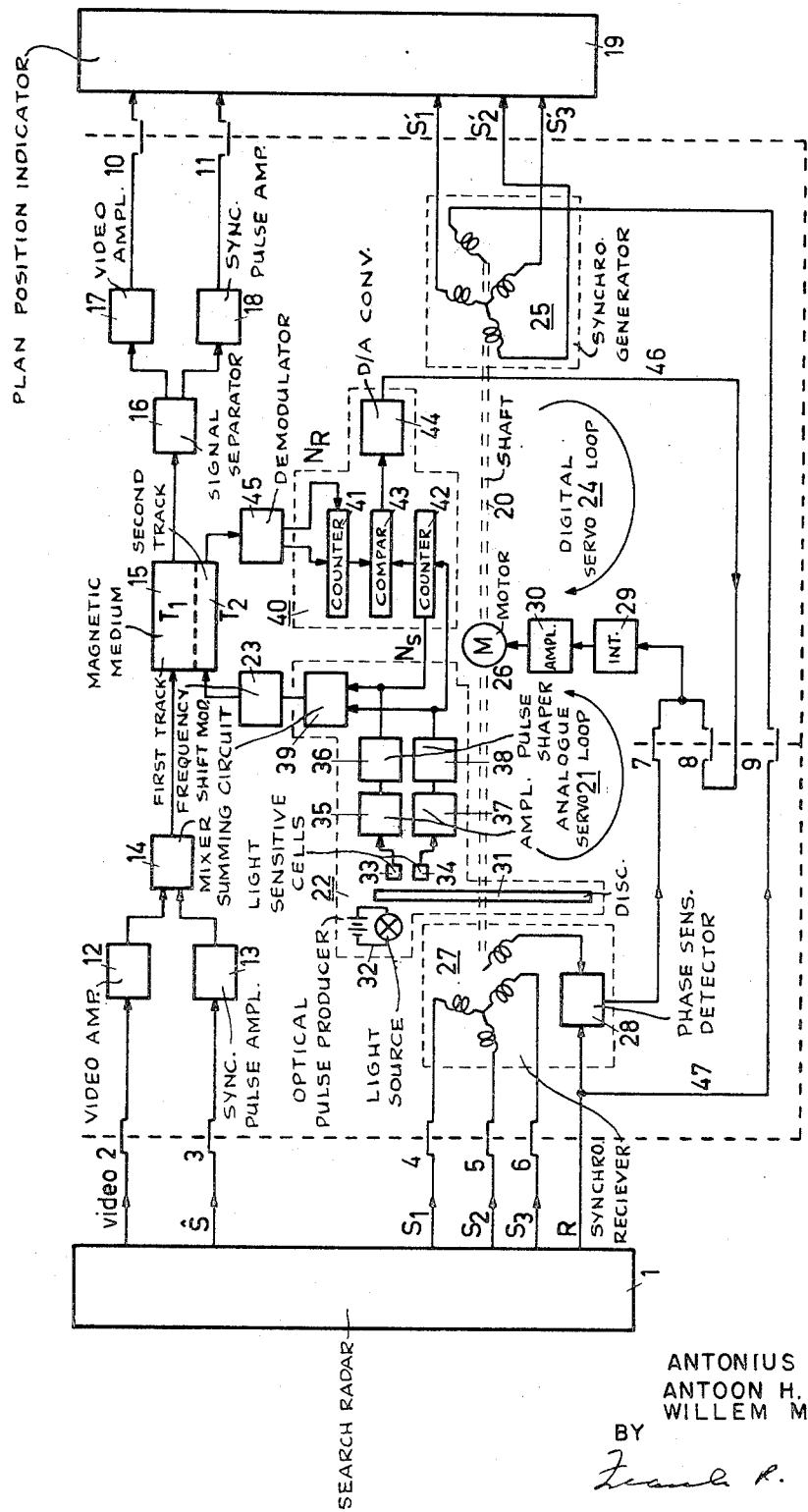

United States Patent [19]

Bouman et al.

[11] 3,710,380
[45] Jan. 9, 1973

[54] SYSTEM FOR RECORDING AND REPRODUCING RADAR VIDEO SIGNALS

[75] Inventors: Antonius Fredericus Mattias Bouman, Hengelo; Antoon Hendrikus Brands, Borne; Willem Mulder, Hengelo, all of Netherlands

[73] Assignee: N. V. Hollandse Signaalapparaten, Hengelo (O), Netherlands

[22] Filed: May 5, 1970

[21] Appl. No.: 34,818

[30] Foreign Application Priority Data

May 19, 1969 Netherlands..................6907588

[52] U.S. Cl.................343/5 R, 343/5 DP, 343/5 PC
[51] Int. Cl................................................G01s 7/12
[58] Field of Search..................343/5 R, 5 DP, 5 PC

[56] References Cited

UNITED STATES PATENTS

| 2,861,263 | 11/1958 | McLucas | 343/5 PC X |
| 3,444,553 | 5/1969 | Tsumura et al. | 343/5 R |
| 3,634,858 | 1/1972 | Mitchell | 343/5 R |

Primary Examiner—T. H. Tubbesing
Attorney—Frank R. Trifari

[57] ABSTRACT

A system for recording and reproducing radar video signals supplied by a pulse radar wherein the video signals and transmitter synchronizing pulses are recorded on a first track of a magnetic medium and information characteristic of the angular positions of the antenna of the pulse radar are recorded on a second track of the same magnetic medium. The system comprises a shaft rotating substantially in synchronism with the antenna, an analogue servo-loop system coupled to the shaft and closed during recording intervals to control the shaft so that the angular positions of the shaft accurately corresponds with the positions of the antenna. The system further comprises means for translating the angular positions of the shaft into digital signals during recording intervals and a frequency shift modulator for converting these digital signals into a frequency keyed signal that is recorded on the second track of the magnetic medium. During reproducing intervals the system comprises a digital servo-loop system for controlling the shaft so that the angular positions of the shaft corresponds accurately with the angular positions derived from the magnetic medium. The system further comprises means for deriving from the shaft, analogue signals characteristic of the angular position of the shaft.

6 Claims, 2 Drawing Figures

SYSTEM FOR RECORDING AND REPRODUCING RADAR VIDEO SIGNALS

The invention relates to a system for recording and reproducing radar video signals, in which the video signals together with the transmitter synchronizing pulses are recorded on a first track and the associated angular information characteristic of the angular aerial position is recorded on a second track of a magnetic medium.

In a known system of this kind the radar video signals and the radar synchronizing pulses are processed in an amplifier and mixer to form a composite signal which is recorded on said first track of the magnetic medium. During reproduction these radar video signals and synchronizing pulses are separated from each other in a signal separator, after which the video signals can be applied through a video amplifier and the synchronizing pulses can be applied through a sync.pulse amplifier to a radar indicator. The angular aerial position produced by a synchro or magslip is converted in this known system into two enveloping signals which are applied to a multiplex modulator. The output signal of this modulator is recorded on said second track of the magnetic medium in synchronism with the first track. During reproduction the recorded signals characteristic of the angular aerial position are converted by means of a separating stage and two demodulators into two envelope signals, which are brought to the desired output level in separate amplifying channels. This known system has the disadvantage that the modulators and demodulators have to be constructed with utmost care in order to avoid drift phenomena. The system has furthermore the serious disadvantage that as a result of relative differences in the separate amplifying channels the amplified envelope signals do not accurately correspond to the original angular information, which results in differences between the reproduced radar images and the original ones.

The invention has for its object to obviate the aforesaid disadvantages. According to the invention a system of the kind set forth comprises to this end a shaft, an analogue servo-loop closed during recording intervals for controlling said shaft so that the angular position of the shaft accurately corresponds to the instantaneous angular aerial position, a device translating the angular position of said shaft into digital signals and a frequency-shift modulator converting these digital signals into a frequency-keyed signal to be recorded on said second track of the magnetic medium; a digital servo-loop closed during reproduction intervals for controlling said shaft so that the angular position of the shaft accurately corresponds to the angular position derived from said magnetic medium and a device for deriving from the shaft analogue signals characteristic of said angular position of the shaft.

Figure 2:
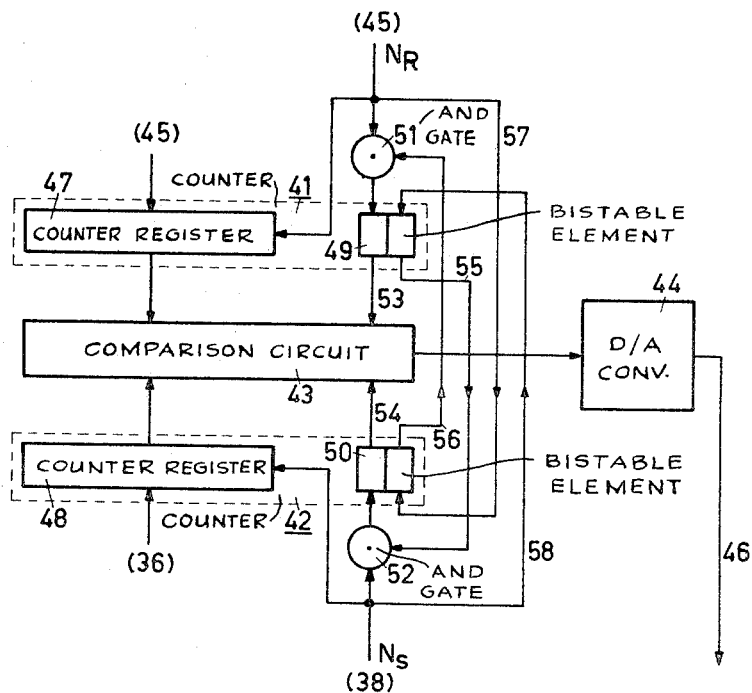

The invention and its advantages will be described more fully with reference to the figures, of which FIG. 1 shows in a block diagram a possible embodiment of the system according to the invention, and FIG. 2 illustrates more in detail the system shown in FIG. 1.

Like reference numerals denote like parts in both figures.

Referring to the embodiment shown in FIG. 1, reference numeral 1 designates a search radar supplying a video signal and synchronizing pulses $\hat{S}$ and the angle information associated with the video signal and being characteristic of the angular aerial position. Said information is formed by three synchro voltages $S_1$, $S_2$ and $S_3$ produced in the radar apparatus with the aid of a synchro coupled with the aerial shaft. This synchro (not shown) is fed by a reference voltage R, which together with the video signal, the synchronizing pulses $\hat{S}$ and the synchro voltages $S_1$, $S_2$ and $S_3$ has to be applied to the system to be described hereinafter for recording and reproducing the radar information. Since this system has two operational states, i.e. recording and reproduction, switching means are provided for changing over the system from one operational state to the other. These switching means are formed by a plurality of relay contacts 2 to 11, which are all actuated simultaneously. In the figure these relay contacts are shown in the "recording" position. In this operational state the radar video signal and the synchronizing pulses $\hat{S}$ are applied to a mixing stage 14 via the relay contacts 2 and 3 and subsequent to amplification in the video amplifier 12 and a sync pulse amplifier 13 respectively. The output signal of the mixing stage 14 is recorded on the first track $T_1$ of the magnetic medium 15. The video signal and the synchronizing pulses thus recorded may be reproduced at any time by changing over to the other operational state of the system. To this end the recorded signal read from the magnetic medium 15 is applied to a signal separator 16, which separates the video signal and the synchronizing pulses from each other and applies them to a video amplifier 17 and a sync pulse amplifier 18 respectively. The amplified video signals and sync pulses are directly applied to the video input and the sync pulse input of a plan position indicator 19 respectively via the relay contacts 10 and 11 which are closed in this operational state.

The angular information is recorded on a second track $T_2$ of the magnetic medium 15 in synchronism with the first track $T_1$.

According to the invention a particularly accurate reproduction of the initial radar information is obtained, when the system for the purpose of recording and reproducing the angular information is provided with a shaft 20, an analogue servo-loop 21 closed during recording intervals, for controlling said shafts so that the angular position of the shaft accurately corresponds to the instantaneous angular position of the aerial, a device 22 translating the angular position of said shaft into digital signals and a frequency-shift modulator 23 converting said digital signals into a frequency-keyed signal to be recorded on said second track $T_2$ of the magnetic medium 15, a digital servo-loop 24, closed during reproduction intervals, for controlling the shaft 20 so that the angular position of the shaft accurately corresponds to the angular position derived from the magnetic medium and a device 25 converting the angular position of the shaft into analogue signals characteristic of said angular position.

In the embodiment shown the analogue servo-loop 21 is constructed in known manner. It comprises a motor 26 and a synchro receiver 27. Through the relay contacts 4, 5 and 6, closed during the recording interval, the three synchro voltages $S_1$, $S_2$ and $S_3$ are applied to the three stator windings of the synchro receiver, so that a rotary field is produced which rotates in synchronism with the aerial rotation. The rotor of said synchro receiver is coupled with the shaft 20, driven by motor 26. When the speed of rotation of said rotor is synchronous to the rotational speed of the rotary field, the rotor does not supply any voltage, provided it is in a given position with respect to the rotary field. When the rotor deviates from this given position, the rotor supplies an alternating voltage whose amplitude is a measure for said deviation and whose phase is a measure for the sense of the deviation. This voltage is applied to a phase-sensitive detector 28, to which the reference signal R, supplied by the radar apparatus 1, is applied as a reference. At the output of the phase-sensitive detector then appears a voltage whose amplitude is a measure for the magnitude of the difference between the angular position of the shaft 20 and the angular position of the aerial, the sign of said difference indicating whether the shaft 20 leads or lags with respect to the aerial rotation. This voltage is applied through the relay contact 7 to an integrator 29, which produces a control-voltage. Subsequent to amplification in an amplifier 30 this control voltage is fed to motor 26, controlling the latter so that the angular position of the shaft 20 corresponds accurately with the angular position of the aerial during the recording interval.

The device 22 in this embodiment is formed by an optical pulse producer which comprises a disc 31, arranged on the shaft 20 and having at its outer periphery 256 recesses corresponding to the division of one aerial revolution into 256 angle increments. On one side of the disc 31 a light source 32 is arranged and two light-sensitive cells 33 and 34 are disposed on the other side. The cell 33 receives light 256 times in each revolution of the aerial through the recesses passing by the light source in order of succession and thus supplies 256 pulses, which are applied subsequent to amplification in an amplifier 35 to a pulse shaper 36. The cell 34 receives light once in each revolution through an opening in the disc. This opening is disposed so that the pulse supplied by the cell 34 appears when the aerial points in a given direction, for example, the North direction. The North pulse $N_s$ supplied by the cell 34 is applied subsequent to amplification in an amplifier 37 to a pulse shaper 38. The angle increment pulses appearing in each revolution of the aerial at the output of the pulse shaper 36 and the North pulse $N_s$ appearing at the output of the pulse shaper 38 are joined in a summation circuit 39 so that the polarity of the North pulse is opposite that of the angle increment pulses. The signal appearing at the output of the summation circuit 39 is converted in a frequency-shift modulator 23 into a frequency-keyed signal, which is recorded on the second tract $T_2$ of said magnetic medium 15.

For the reproduction of the recorded angular information the other operational state is switched on, in which the relay contacts 2 to 11 are in the position not shown. As a result the motor 26 is no longer controlled by the control-voltage produced by synchro receiver 27. The motor-control is now carried out by the digital servo-loop 24. The latter includes said motor 26 and a device 40. The latter will be described hereinafter with reference to FIG. 2 so that it may be sufficient here to state that this device comprises two counters 41 and 42, a digital comparison circuit 43 and a digital-analog converter 44, connected to the output of said comparison circuit.

The signal derived from the second track of the magnetic medium 15 is demodulated in a demodulator 45, at the output of which appear angle increment pulses and North pulses $N_R$. These North pulses are designated here by $N_R$ to distinguish them from the North pulses $N_s$ appearing at the output of the pulse shaper 38. The angle increment pulses appearing at the output of the demodulator 45 and the North pulses $N_R$ are applied the counter 41, which starts counting the angle increment pulses upon the reception of a North pulse $N_R$. The contents of the counter 41 are therefore representative of the recorded angular position of the shaft 20. The angle increment pulses supplied by the pulse shaper 36 are applied to the counter 42, which starts counting these pulses upon the reception of a North pulse $N_s$ supplied by the pulse shaper 38. The contents of the counter 42 are representative of the instantaneous angular position of the shaft 20. The contents of the two counters 41 and 42 are compared with each other in the comparison circuit 43, the digital output signal corresponding to the difference of angular positions being applied to the digital-analog converter 44. The output voltage of said digital-analog converter is applied through lead 46 and relay contacts 8, which are closed during reproduction, to the integrator 29. The latter produces a control-voltage which is fed to motor 26 via amplifier 30. Motor 26 is thus controlled so that the angular position of shaft 20 corresponds accurately with the recorded angular position during the reproduction interval. The analogue signals accurately corresponding thereto are supplied by the device 25. In the embodiment shown this device comprises a synchro generator which is similar to the synchro generator that is coupled with the aerial shaft. It comprises three stator windings and a rotor arranged on shaft 20. The reference voltage R is applied to the rotor through lead 47 and the contacts 9, which are closed during reproduction. The voltages thus produced in the three stator windings are applied as synchro voltages $S_1'$, $S_2'$ and $S_3'$ to the angle-information inputs of the plan position indicator 19.

Since in the system according to the invention the angle information is converted into a digital signal prior to recording, drift phenomena in the modulator 23 and in the demodulator 45 cannot affect adversely the accuracy of reproduction of said angle information. Moreover, the need for separate amplifying channels for raising the output voltage to a desired level is completely eliminated by the use of the synchro generator 25. Thus a particularly accurate reproduction of the original radar image is achieved.

FIG. 2 shows the device 40 in greater detail. The device comprises the said counters 41 and 42, the digital comparison circuit 43 and the digital-analog converter 44. The counters 41 and 42 are constituted by the counting registers 47 and 48 respectively, each comprising eight bistable elements, requiring 256 angle increment pulses to traverse a count equal to the counter modulus. The counting register 47 is reset by the North pulses $N_R$ appearing at the output of demodulator 45. The counting register 48 is reset by the North pulses $N_s$ appearing at the output of the pulse shaper 38.

The North pulses $N_R$ and $N_s$ will not occur at the same time, unless the servo-loops 21 and 24 have had time to run in. Therefore, during the initial period of operation, the counting registers 47 and 48 will usually not be reset simultaneously. Since the output signal of the digital comparison circuit 43 is proportional to the difference between the contents of these counting registers it will be evident that strong and abrupt variations will occur in this output signal each time when one of the counting registers is reset to zero.

In order to avoid these strong and abrupt variations the counters 41 and 42 are furthermore provided with a bistable element 49 and 50 respectively, operating as an overflow. The set-input of bistable element 49 is connected through an AND-gate 51 to the $N_R$ output of demodulator 45 (FIG. 1). The set-input of bistable element 50 is connected through an AND-gate 52 to the $N_s$ output of pulse shaper 38 of FIG. 1.

When the counting registers 47 and 48 have not yet traversed a count equal to the counter modulus, the two bistable elements 49 and 50 are in their first stable state in which they do not supply an output voltage through the respective output leads 53 and 54 to the comparison circuit 43. In this first stable state the bistable element 49 supplies, however, through its output lead 55, a voltage holding the gate 52 in the open state. Likewise bistable element 50 supplies through its output lead 56 a voltage holding the gate 51 in the open state. In the first stable state of the two bistable elements 49 and 50 the counter modulus of the counters 41 and 42 is equal to that of their counting registers 47 and 48.

Assuming counting register 47 to have first traversed a count equal to the counter modulus this counting register is reset by the then appearing North pulse $N_R$. This North pulse $N_R$ is furthermore applied through the open gate 51 to the set-input of bistable element 49, which is thus passed into its other stable state. The north pulse $N_R$ is furthermore applied through lead 57 to the reset-input of bistable element 50 in order to ensure that this bistable element is in the first stable state. The change-over of bistable element 49 to the other stable state raises the counter modulus of counter 41 by a factor 2, because bistable element 49 supplies through its output lead 53 a voltage to comparison circuit 43. In this other stable state of bistable element 49, gate 52 is closed because output lead 55 does not apply voltage to said gate. When some time afterwards the North pulse $N_s$ appears, this North pulse cannot pass through gate 52, so that bistable element 50 remains in its first stable state. The North pulse $N_s$ is, however, applied to counting register 48, which is thus reset and this North pulse is also applied through lead 58 to the reset-input of bistable element 49, which thus returns to its first stable state. Since, with respect to the two counters 41 and 42 the arrangement is symmetrical, the same explanation applies when counting register 48 has first traversed a count equal to the counter modulus. After the foregoing it will be obvious that the counter modulus of only that counter that first receives the North pulse is raised by a factor 2 and that this raise in counter modulus is maintained only until also the other counter receives its North pulse.

The system in accordance with the invention is distinguished from known systems inter alia in that a servo-controlled shaft is employed. This concept has the particular advantage that the system can readily match different types of radar and indicators, since the synchro receiver 27 and the synchro generator 25 may individually be adapted to the power of the angle information supplied by the radar and to the power with which the recorded angle information has to be supplied to the radar indicator respectively. If these two powers are equal, it is possible to replace the separate synchro receiver 27 and the separate synchro generator 25 by a single synchro whose rotor is provided with two separate windings, which are at an angle of 90° to each other so that together with one rotor winding the stator forms a synchro receiver operative during the recording interval, whereas together with the other rotor winding, said stator forms a synchro generator operative during the reproduction interval.

The system according to the invention is, moreover, readily adaptable when the angle information is directly supplied in digital form by the radar device or when the plan-position indicator is adapted to receive angle information in digital form.

What we claim is:

1. A system for recording and reproducing radar video signals supplied by a pulse radar comprising means for recording on a magnetic medium said video signals together with transmitter synchronizing pulses on a first track and associated angle information characteristic of the angular position of the antenna of said pulse radar on a second track, comprising a shaft member, an analogue servo-loop system closed during recording intervals for controlling said shaft member so that the angular position of said shaft member accurately corresponds with the instantaneous angular position of the antenna, means for translating the angular position of said shaft member into digital signals, a frequency-shift modulator converting said digital signals into a frequency keyed signal to be recorded on said second track of the magnetic medium, means for controlling said shaft so that the angular position of the shaft corresponds accurately with the angular position derived from said magnetic medium comprising a digital servo-loop system closed during reproducing intervals and means for deriving from the shaft, analogue signals characteristic of the angular position of said shaft.

2. A system as claimed in claim 1 wherein the means for translating the angular position of said shaft into digital signals comprises an optical pulse producer which supplies in each revolution of the shaft a discrete number of angle-increment pulses and a first reference pulse, the pulse producer having on the one hand two outputs at which the angle-increment pulses and the first reference pulse appear separately and on the other hand a single output at which the angle-increment pulses and the first reference pulse appear in conjunction.

3. A system as claimed in claim 1 wherein said digital servo-loop system comprises means having a first counter to which the angle-increment pulses derived from the magnetic medium and obtained subsequent to demodulation are fed as counting pulses and to which second reference pulses are fed as resetting signals, a second counter to which the angel-increment pulses produced by the optical pulse generator are fed as counting pulses and to which first reference pulses are fed as resetting signals, a digital comparison circuit in which the contents of the two counters are compared and a digital-analog converter to which the digital output signal of said comparison circuit is applied, said output signal being proportional to the difference between the angular position of the shaft and the recorded angular position.

4. A system as claimed in claim 3, wherein the counters each comprise a counting register of counter modulus equal to the number of angle-increment pulses received in each antenna revolution and bistable elements operating as overflows, said bistable elements in the two counters being connected for reciprocal control so that the counting modulus of only that counter that receives the resetting pulse first is raised by a factor of 2 and that this raise in counter modulus is maintained only until the other counter receives its resetting pulse.

5. A system as claimed in claim 1 wherein the means for deriving from the shaft analogue signals characteristic of the angular position of the shaft during reproducing intervals comprises a synchro generator whose rotor is coupled with said shaft and is fed during the reproducing intervals by a third reference voltage produced in the radar apparatus, the synchro voltages characteristic of the angular position appearing across the stator windings of the synchro generator.

6. A system as claimed in claim 1 wherein the means for deriving from the shaft analogue signals characteristic of the angular position of the shaft comprises a synchro-generator and the means for translating the angular position of said shaft into digital signals comprises a synchro receiver said synchro-generator and said synchro receiver being incorporated into a single synchro whose rotor is provided with two separate windings arranged at an angle of 90° to each other.

* * * * *